United States Patent
Kando et al.

(10) Patent No.: US 10,013,814 B2
(45) Date of Patent: Jul. 3, 2018

(54) DIAGNOSIS OF AIRCRAFT GAS TURBINE ENGINES

(71) Applicant: MTU Aero Engines AG, Munich (DE)

(72) Inventors: Andre Kando, Dachau (DE); Hassan Abdullahi, Dachau (DE); Anastasios Tsalavoutas, Kaisariani/Athen (GR); Thomas Speer, Karlsfeld (DE)

(73) Assignee: MTU AERO ENGINES AG, Munich (DE)

( * ) Notice: Subject to any disclaimer, the term of this patent is extended or adjusted under 35 U.S.C. 154(b) by 83 days.

(21) Appl. No.: 15/058,237

(22) Filed: Mar. 2, 2016

(65) Prior Publication Data
US 2016/0260263 A1    Sep. 8, 2016

(30) Foreign Application Priority Data
Mar. 4, 2015    (EP) .................... 15157614

(51) Int. Cl.
*G07C 5/00*    (2006.01)
*B64D 45/00*    (2006.01)
*F02C 7/00*    (2006.01)
*G05B 23/02*    (2006.01)

(52) U.S. Cl.
CPC ............. *G07C 5/004* (2013.01); *B64D 45/00* (2013.01); *F02C 7/00* (2013.01); *G05B 23/024* (2013.01); *G05B 23/0275* (2013.01); *B64D 2045/0085* (2013.01); *F05D 2230/72* (2013.01); *F05D 2260/80* (2013.01)

(58) Field of Classification Search
CPC .. G07C 5/004; G05B 23/0275; G05B 23/024; F02C 7/00; B64D 45/00; B64D 2045/0085; F05D 2260/80; F05D 2230/72
See application file for complete search history.

(56) References Cited

U.S. PATENT DOCUMENTS

| | | |
|---|---|---|
| 6,125,312 A | 9/2000 | Nguyen et al. |
| 6,216,066 B1 | 4/2001 | Goebel et al. |
| 6,499,114 B1 | 12/2002 | Almstead et al. |
| 6,574,537 B2 | 6/2003 | Kipersztok et al. |
| 6,748,304 B2 | 6/2004 | Felke et al. |
| 7,027,953 B2 | 4/2006 | Klein |
| 7,062,370 B2 | 6/2006 | Vhora et al. |
| 7,065,471 B2 | 6/2006 | Gotoh et al. |
| 7,337,086 B2 | 2/2008 | Guralnik et al. |

(Continued)

FOREIGN PATENT DOCUMENTS

| | | |
|---|---|---|
| EP | 1288644 A2 | 3/2003 |
| EP | 1495384 B1 | 2/2006 |

(Continued)

*Primary Examiner* — Rodney A Butler
(74) *Attorney, Agent, or Firm* — Barlow, Josephs & Holmes, Ltd.

(57) ABSTRACT

A method for the at least partially automated diagnosis of aircraft gas turbine engines includes the steps of: 1) detecting actual parameter values of an aircraft gas turbine engine for several operational segments 2) determining deviations, of these actual parameter values from theoretical parameter values; and 3) determining damage pattern probabilities based on a similarity of at least one determined deviation, particularly based on a change between determined deviations, to deviation patterns of different known damage patterns.

13 Claims, 1 Drawing Sheet

(56) References Cited

U.S. PATENT DOCUMENTS

| | | |
|---|---|---|
| 7,366,639 B2 | 4/2008 | Doel et al. |
| 7,369,932 B2 | 5/2008 | Kim et al. |
| 7,395,188 B1 | 7/2008 | Goebel et al. |
| 7,506,517 B2 | 3/2009 | Uluyol et al. |
| 7,702,435 B2 | 4/2010 | Pereira et al. |
| 8,116,990 B2 | 2/2012 | Koul |
| 8,396,689 B2 | 3/2013 | Pfeifer et al. |
| 2007/0124113 A1 | 5/2007 | Foslien et al. |
| 2008/0243328 A1 | 10/2008 | Yu et al. |
| 2011/0191002 A1 | 8/2011 | Whatley et al. |
| 2012/0041575 A1 | 2/2012 | Maeda et al. |
| 2012/0330499 A1 | 12/2012 | Scheid et al. |
| 2013/0173135 A1 | 7/2013 | Kim |
| 2013/0304420 A1* | 11/2013 | Laval .................. G05B 23/0272 702/184 |
| 2014/0365036 A1* | 12/2014 | Moeckly ................... F02C 9/00 701/3 |
| 2015/0152791 A1* | 6/2015 | White ........................ F02C 9/26 60/773 |
| 2016/0069274 A1* | 3/2016 | Chapman ............... B64D 31/06 701/14 |

FOREIGN PATENT DOCUMENTS

| | | |
|---|---|---|
| EP | 1729243 B1 | 7/2008 |
| EP | 2015186 A2 | 1/2009 |
| EP | 2141560 A2 | 1/2010 |
| EP | 2207072 A2 | 7/2010 |
| EP | 1420153 B1 | 8/2010 |
| EP | 2256319 A2 | 12/2010 |
| EP | 2047339 B1 | 10/2011 |
| EP | 1630633 B1 | 6/2012 |
| EP | 2202500 B1 | 11/2012 |
| EP | 1811133 B1 | 6/2014 |
| JP | 2001032724 A | 2/2001 |
| WO | 2010051128 A1 | 5/2010 |

* cited by examiner

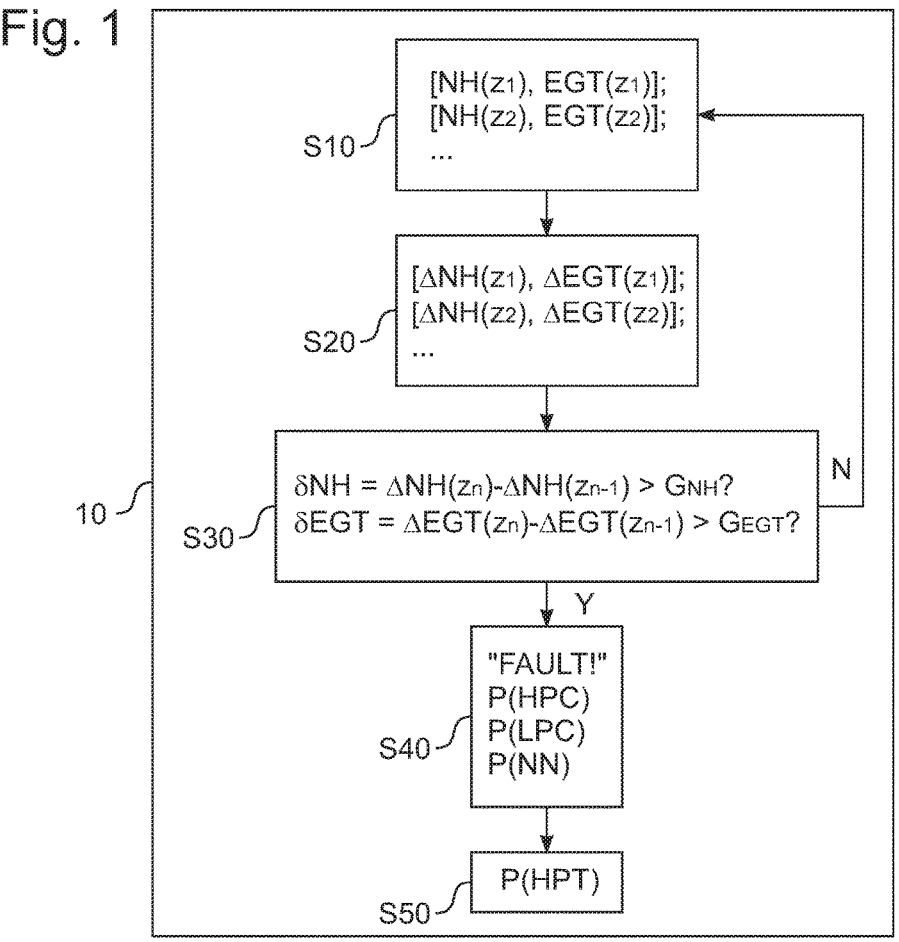
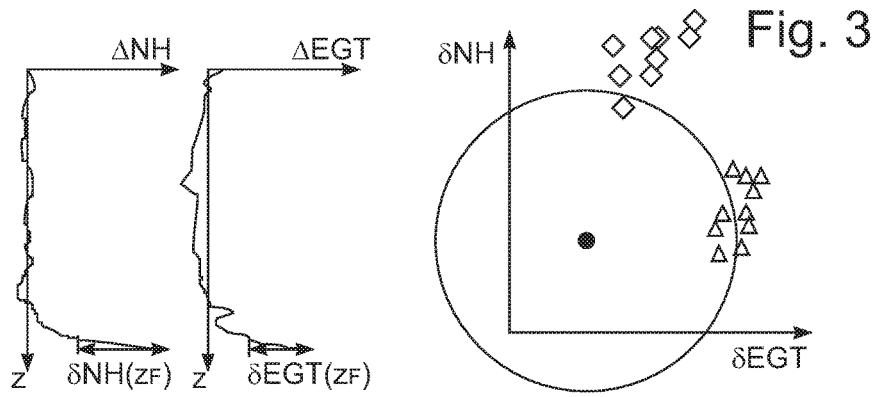

DIAGNOSIS OF AIRCRAFT GAS TURBINE ENGINES

BACKGROUND OF THE INVENTION

The studies that have led to this invention were supported within the scope of the Seventh Framework Program of the European Union (RP7/2007-2013, E-BREAK).

The present invention relates to a method and a system for the at least partially automated diagnosis of aircraft gas turbine engines, as well as a computer program product for carrying out the method.

In order to recognize damage as early as possible and to be able to initiate appropriate measures, in particular maintenance or repairs, it is known according to internal company practice to analyze actual parameter values of aircraft gas turbine engines.

SUMMARY OF THE INVENTION

An object of an embodiment of the present invention is to improve the diagnosis of aircraft gas turbine engines.

This object is achieved by the method of the present invention. The present invention also provides for a system or a computer program product for carrying out a method described here. Advantageous embodiments of the invention are discussed in detail below.

According to one aspect of the present invention, a method for the completely or partially automated diagnosis of aircraft gas turbine engines comprises the steps of:

a) detecting actual parameter values of an aircraft gas turbine engine for a plurality of operational segments;

b) determining deviations of these actual parameter values from theoretical parameter values, in particular theoretical target parameter values; and c) determining damage probability patterns based on a similarity of at least one determined deviation, particularly based on a change between determined deviations, to deviation parameters of various known damage patterns.

Based on these types of determined damage probability patterns, in an embodiment, advantageously, appropriate measures, particularly maintenance, particularly repairs, can be recommended and/or initiated.

In one embodiment, damage patterns comprise one or more components, in particular one or more subassemblies, each having several components, of the aircraft gas turbine engine, for example, a guide vane (array) and/or a rotating blade (array), one or more compressor and/or turbine stages of the aircraft gas turbine engine or the like, and/or one or more defects, particularly of the/on the component(s) or subassembly (subassemblies), for example, an at least partially damaged blade surface, a failure of a blade adjustment, a cracked bushing, or the like.

In one embodiment, a (multidimensional) actual parameter value comprises values for several different parameters, particularly thermodynamic and/or kinematic, state or operating parameters of aircraft gas turbine engines, in particular, one or more pressures, particularly in front of, in, and/or in back of one or more stages of the aircraft gas turbine engine, in particular, one or more temperatures, particularly in front of, in, and/or in back of one or more stages of the aircraft gas turbine engine, a fuel consumption and/or fuel mass flow, and/or one or more rotational speed values, particularly of one or more rotors of the aircraft gas turbine engine. Correspondingly, in one embodiment, an actual parameter value generally comprises one or more state or operating parameters of the aircraft gas turbine engine, and can also be designated, in particular, as a multidimensional, actual state parameter value.

In one embodiment, actual parameter values, which have been measured during operation and have been transmitted or received, preferably wirelessly and/or via the internet, are detected. In an enhancement, detected actual parameter values for the respective operational segment are averaged and/or filtered for a plurality of measurement data. In particular, an operational segment can be a takeoff, particularly one of a plurality of takeoffs, a landing, particularly one of a plurality of landings, or a stationary or cruising state, particularly one of a plurality of cruising states. A cruising state and a previous takeoff and/or another cruising state following thereon can thus represent different operational segments, for which actual parameter values can be detected in each case.

In one embodiment, the theoretical parameter values are determined on the basis of a model, particularly a thermodynamic model, of the aircraft gas turbine engine, which, in one enhancement, maps detected actual (initial) parameter values onto the theoretical (output) parameter values.

$$p_{theoretical,out} = M(p_{actual,in}, \text{operational segment})$$

Correspondingly, in one embodiment, a theoretical parameter value generally comprises one or a plurality of state or operating parameters, in particular, output parameters of the aircraft gas turbine engine model and can also be designated, in particular, as a multidimensional, theoretical state parameter value, particularly an output parameter value.

In an enhancement, this model is initially calibrated, i.e., prior to a first (flight) operation and/or on the basis of the first or oldest operational segment. Model defects and/or systematic errors can be advantageously reduced thereby. One or a plurality of model parameters will be adjusted during calibration. For differentiating such model parameters, theoretical or actual (state) parameter values can also be designated (theoretical or actual) state variables.

In one embodiment, the deviation of actual (state) parameter values from the theoretical (state) parameter values is determined in each case for a plurality of operational segments. In one embodiment, the deviations here are multidimensional in each case and comprise the deviations of the actual from the theoretical values of different (state) parameters of the aircraft gas turbine engine for the respective operational segment. In an enhancement, the deviations are filtered or smoothed over the operational segments, particularly in order to reduce noise and thus to improve the precision, robustness, and/or reliability of the diagnosis.

In one embodiment, for one or a plurality of operational segments, each change in the determined deviation compared with a determined deviation of one or a plurality of earlier operational segments, in particular, compared with a determined deviation of a preceding operational segment, particularly a directly preceding operational segment, will be determined.

In one embodiment, an error message will be generated if a deviation, in particular, one or a plurality of its components, exceeds a predetermined (deviation) limit value, especially component by component.

Advantageously, an exceeding of absolute limits for deviations can be detected thereby.

Additionally or alternatively, in one embodiment, an error message is generated if a change in the deviations, in particular one or more components of the change, exceeds a predetermined (change) limit value, especially component by component.

Advantageously, an exceeding of relative limits for the deviations can be detected thereby.

The operational segment for which the error message is generated, or a preceding operational segment, in particular, a segment directly preceding it, is also designated herein as a defective operational segment. Based on inertia, the error message is usually generated only for an operational segment that follows after, especially directly after, the specific operational segment in which the error or the damage pattern has occurred or has been shown by the (change in the) deviation.

According to one aspect of the present invention, damage pattern probabilities are determined on the basis of a similarity of at least one deviation to deviation patterns of different known damage patterns, particularly only, or also if, an error message is generated.

In this case, in one embodiment, deviation patterns of known damage patterns comprise the deviations themselves. Thus, for example, a specific, known damage pattern can be or will be assigned to a specific deviation of specific actual parameter values from theoretical parameter values, especially those that are based on the model. Correspondingly, in one embodiment, damage pattern probabilities are determined on the basis of a similarity of a deviation to deviation patterns of different known damage patterns; the deviation is determined particularly for a defective operational segment.

Additionally or alternatively, in one embodiment, deviation patterns of known damage patterns can comprise changes in the deviation, particularly when compared to at least one preceding deviation, particular a directly preceding deviation, or when compared with a deviation of at least one preceding operational segment, in particular a directly preceding operational segment. Thus, for example, a specific known damage pattern can be or will be assigned to a specific change in the deviation of specific actual parameter values when compared to a preceding deviation. Correspondingly, in one embodiment, damage pattern probabilities are determined on the basis of a similarity of a change between deviations determined especially sequentially, particularly directly sequentially, to deviation patterns of different known damage patterns. Thus, in this embodiment, damage pattern probabilities are determined on the basis of a similarity of two determined deviations, namely on the basis of a change between these two determined deviations, to deviation patterns of different known damage patterns.

In one embodiment, the known damage patterns and/or the deviation patterns assigned to the latter are stored in a database, which, in an enhancement, will be updated on the basis of known damage incidents of the aircraft gas turbine engine, and/or of other aircraft gas turbine engines, in particular, those of similar type or construction.

According to one aspect of the present invention, additionally, a damage pattern probability is also determined for an unknown damage pattern or in case an unknown damage pattern is present.

In this way, in one embodiment, advantageously, the risk of an erroneous diagnosis can be reduced: If only unknown damage patterns are considered, and, based on the damage pattern probability, the most probable of the known damage patterns is assumed as the indicative damage pattern that is the basis of a current deviation, particularly a change in deviation, or has caused this, it may lead to the fact that an inaccurate damage pattern will be assumed, just because this is more probable than other (yet more improbable) known damage patterns. In contrast, due to the determination of a damage pattern probability for an unknown damage pattern, it can be recognized advantageously when a current deviation, in particular a deviation change, likely can be attributed to a new damage pattern, particularly one that is not stored in the database.

According to one aspect of the present invention, cause probabilities are determined for an unknown damage pattern on the basis of a model of the aircraft gas turbine engine.

In this case, the model can be particularly essentially the same as the model described here, on the basis of which theoretical parameter values are determined.

In one embodiment, this model of the aircraft gas turbine engine, based on which cause probabilities will be determined, is calibrated prior to determining cause probabilities based on current actual parameter values of the aircraft gas turbine engine; in particular, the model, based on which the theoretical parameter values are determined, can be re(calibrated) on the basis of current actual parameter values of the aircraft gas turbine engine.

In one embodiment, advantageously, a change, particularly an aging, of the aircraft gas turbine engine can be considered by a (re)calibration based on current actual parameter values. This is particularly advantageous, since the determination of cause probabilities is clearly more sensitive to model defects than the determination of damage pattern probabilities.

In one embodiment, the current actual parameter values, based on which the model is calibrated for determining cause probabilities, comprise or contain detected actual parameter values for one or a plurality of the most recent ten operational segments, in particular the operational segment(s), which precede(s) or go(es) before, particularly directly preceding, the operational segment for which an error message is generated, or the operational segment directly preceding the error message, i.e., the defective operational segment.

In one embodiment, cause probabilities are determined based on (model) parameter variations, in particular, combinatorial variations, of the model of the aircraft gas turbine engine. In other words, model parameters that, in one embodiment, differ from the theoretical or state parameters or variables of the model, in particular, are of a different type, are varied or perturbed, in particular combinatorially or individually, and in different combinations with one another.

In one embodiment, just like damage patterns, causes may comprise one or more components, in particular one or more subassemblies, each having several components, of the aircraft gas turbine engine, for example, a guide vane (array) and/or a rotating blade (array), one or more compressor and/or turbine stages of the aircraft gas turbine engine or the like, and/or one or more defects, particularly of the/on the component(s) or subassembly (subassemblies), for example, an at least partially damaged blade surface, a failure of a blade adjustment, a cracked bushing, or the like.

In one embodiment, one or more parameter (values) of the model, particularly individually and/or in one or a plurality of combinations, particularly in combinations of two each, three each, and/or more model parameter (values), are varied, in particular, with a plurality of different values, and one or a plurality of theoretical or state values, particularly output parameter or variable values of a model varied in this way are compared with detected actual parameter values, in particular, for the defective operational segment or the operational segment for which the error message has been generated, or are compared with the directly preceding operational segment. Then probabilities for the cause of the (change in the) deviation are determined, especially on the basis of a similarity between the theoretical parameter values of the model and the actual parameter values of the defective operational segment.

For example, a model parameter value that depends on a guide vane adjustment of the aircraft gas turbine engine, in particular, describes the latter, is varied individually and in combination with one or a plurality of other model parameter values that do not depend on the guide vane adjustment. If the models varied in this way or their theoretical output parameter values in each case have a greater similarity to the detected actual parameter values of the defective operational segment than do models in which the model parameter value that depends on a guide vane adjustment of the aircraft gas turbine engine is not varied, a high or higher probability can be assigned to an error in the guide vane adjustment as being the cause of the damage pattern or the (change in the) deviation.

In one embodiment, one or more of the steps is (are) carried out partially or completely automatically in each case.

According to one aspect of the present invention, a system for the diagnosis of aircraft gas turbine engines is equipped for carrying out a method described here, and/or has:

means for detecting actual parameter values of an aircraft gas turbine engine for a plurality of operational segments;

means for determining deviations of these actual parameter values from model-based theoretical parameter values; and means for determining damage pattern probabilities based on a similarity of at least one determined deviation, particularly based on a change between determined deviations, to deviation parameters of various known damage patterns.

In the sense of the present invention, a means can be designed technically by hardware and/or software, in particular, a data-linked or signal-linked—especially digital—processing unit (CPU), particularly a microprocessor, preferably with a memory and/or a bus system, and/or can have one or a plurality of programs or program modules. The CPU can be designed for the purpose of executing commands that are implemented as a program filed in a memory system, to detect input signals from a data bus, and/or to deliver output signals to a data bus. A memory system can have one or more, particularly different, memory media, particularly optical, magnetic, hard-drive, and/or other non-volatile media. The program can be designed such that it incorporates the method described here and is capable of executing it, so that the CPU can execute the steps of such a method and thus, in particular, can carry out a diagnosis of an aircraft gas turbine engine in an at least partially automated manner.

BRIEF DESCRIPTION OF THE DRAWING FIGURES

Other advantageous enhancements of the present invention are set forth in detail below in following description of preferred embodiments. For this purpose and partially schematized:

FIG. 1 shows a method for the diagnosis of aircraft gas turbine engines according to one embodiment of the present invention;

FIGS. 2A and 2B show two components of deviations of actual parameter values from theoretical parameter values; and FIG. 3 shows a comparison of deviations with deviation patterns of different known damage patterns.

DESCRIPTION OF THE INVENTION

FIG. 1 shows a method for the diagnosis of aircraft gas turbine engines according to an embodiment of the present invention, which is carried out in an at least partially automated manner by means of a system according to an embodiment of the present invention in the form of a computer 10, which has a medium, particularly a portable or stationary memory means, on which a corresponding program is stored.

In a first method step S10, actual (state or operating) parameter values or variable values of an aircraft gas turbine engine are detected for several operational segments $z_1$, $z_2$, etc.

These actual parameter values in the exemplary embodiment comprise, among other items and given by way of example, a rotational speed NH and a gas temperature EGT of a gas turbine of the engine. They are measured in an ongoing manner during operation, in particular periodically, for different operational segments each time, for example, different takeoffs, landings and/or cruising states; in particular, cruising segments, $z_i$ are averaged, and transmitted, particularly via the internet to the computer 10, which detects them in this transmitted form in step S10.

In a second method step S20, in each case, deviations $\Delta(z_i)$ of the detected actual parameter values are determined in comparison to theoretical (state or operational) parameter values corresponding to these. The components $\Delta NH = NH - NH_{model}$ and $\Delta EGT = EGT - EGT_{model}$ of the deviations over the operational states z are indicated by way of example in FIGS. 2A and 2B.

The theoretical parameter values are determined for this purpose in step S20 based on an initially calibrated thermodynamic model of the aircraft gas turbine engine. This maps detected actual input parameter values, for example, a thrust requirement, level, Mach number and the like, onto the associated theoretical (output) parameter values, among others, the above-mentioned rotational speed $NH_{model}$ and gas temperature $EGT_{model}$ of the gas turbine.

In a step S30, an error message is generated if a deviation exceeds a predetermined (absolute) limit value, or if a change $\delta$ of a deviation $\Delta(z_n)$ when compared with a preceding deviation $\Delta(z_{n-1})$ exceeds a predetermined (relative) limit value G, as is indicated in FIGS. 2A and 2B by $\delta NH(z_F)$ and $\delta EGT(z_F)$. $z_F$ in this case denotes the (defective) operational segment in which the error message is generated or the deviation $\Delta$ exceeds the (absolute) limit value or its change $\delta$ exceeds the (relative) limit value G.

If an error message is generated (S30: "Y"), in a step S40, damage probabilities P based on a similarity of the determined deviation $\Delta$, or the change $\delta$ of the determined deviation $\Delta$, are determined in comparison to a preceding deviation to deviation patterns of different known damage patterns. Otherwise (S30: "N"), the method reverts to step S10.

FIG. 3 illustrates by way of example a comparison of the changes $\delta$ of deviations $\Delta$ with deviation patterns ($\delta NH$, $\delta EGT$) of different known damage patterns. Here, changes in deviations of the parameter values NH and EGT, which are assigned to a known first damage pattern in a database of computer 10, for example, damage in a high-pressure compressor ("HPC") of the gas turbine of the aircraft engine, are indicated by diamonds. In contrast, changes in deviations of the parameter values NH and EGT, which are assigned to a known second damage pattern, for example, damage in a low-pressure compressor ("LPC") of the gas turbine of the aircraft engine, are indicated by triangles.

A damage pattern probability for this damage pattern is determined by means of a k-nearest-neighbor method, known in and of itself, each time corresponding to a number of values of a deviation pattern of a known damage pattern, which lie within a predetermined field around the current (change in the) deviation indicated by a filled circle in FIG. 3.

In the exemplary embodiment, a probability P(HPC) of 0.1 is determined as an example for the known damage pattern of "damage in the high-pressure compressor", and a probability P(LPC) of 0.3 is determined as an example for the known damage pattern of "damage in the low-pressure compressor".

Additionally, a damage pattern probability P(NN) for an unknown damage pattern ("NN") is determined in step S40. In the exemplary embodiment, this amounts to 0.5, based on its great distance from the known damage patterns for HPC, LPC.

In order to save time, parallel to this in step S40, the thermodynamic model is recalibrated by adjusting its (model) parameter values in such a way that it best depicts the last or the most recent actual (state) parameter values prior to the defective operational state $z_F$.

In a step S50, cause probabilities for the unknown damage pattern are determined combinatorially on the basis of the recalibrated model for the aircraft gas turbine engine.

For this purpose, (model) parameters of the model are varied individually and in combination, and (state, particularly, output) parameter values of this varied model are each compared with the corresponding, detected actual parameter values of the defective operational state. A higher cause probability is assigned to model parameters, whose variation results in a greater similarity to the actual parameter values of the defective operational state.

In the exemplary embodiment, for example, a variation in the model parameter that describes a functionality of an active gap regulation in a high-pressure turbine ("HPT") of the gas turbine of the aircraft engine or is associated therewith always brings about an increased similarity. Correspondingly, a maximum cause probability P(HPT) is determined in step S60 for an error in the active gap regulation of the high-pressure turbine.

Although exemplary embodiments were explained in the preceding description, it shall be noted that a plurality of modifications is possible. In addition, it shall be noted that the exemplary embodiments only involve examples that in no way shall limit the scope of protection, the applications, and the construction. Rather, a guide is given to the person skilled in the art by the preceding description for implementing at least one exemplary embodiment, whereby diverse changes, particularly with respect to the function and arrangement of the described components, can be carried out without departing from the scope of protection, as it results from the claims and combinations of features equivalent to these.

What is claimed is:

1. A method for the at least partially automated diagnosis of aircraft gas turbine engines, comprising:
   detecting actual parameter values of an aircraft gas turbine engine for several operational segments with sensors disposed within the aircraft gas turbine engine, the sensor types include at least one of a temperature sensor, a pressure sensor, a mass flow sensor, and a rotational speed sensor, the parameter values comprising temperatures in one or more operational segments of the gas turbine, pressures in one or more stages of the gas turbine, fuel consumption and/or fuel mass flow, and rotational speed values of a rotor of the aircraft gas turbine engine;
   determining deviation, of these actual parameter values from theoretical parameter values of the operation of the aircraft gas turbine engine;
   determining damage pattern probabilities based on a similarity of at least one determined deviation to deviation patterns of various known damage patterns to aircraft gas turbine engines;
   determining a damage pattern probability for an unknown damage pattern; and
   generating an error message if at least one determined deviation exceeds a predetermined limit value,
   wherein damage patterns and/or causes comprise components, subassemblies, and/or defects.

2. The method according to claim 1, wherein cause probabilities are determined for an unknown damage pattern based on a model of the aircraft gas turbine engine.

3. The method according to claim 1, wherein cause probabilities based on variations in parameter values, combinatorial variations, of the model of the aircraft gas turbine engine are determined.

4. The method according to claim 2, wherein prior to determining the cause probabilities, the model of the aircraft gas turbine engine is calibrated, based on current actual parameter values of the aircraft gas turbine engine.

5. The method according to claim 4, wherein the current actual parameter values comprise detected actual parameter values for at least one of the most recent ten operational segments.

6. The method according to claim 1, wherein actual parameter values comprise values measured during operation and/or averaged values, and/or values transmitted via the internet, for different aircraft gas turbine engine parameters.

7. The method according to claim 1, wherein deviations of actual parameter values from theoretical parameter values are filtered.

8. The method according to claim 1, wherein theoretical parameter values are determined based on an initially calibrated model of the aircraft gas turbine engine.

9. The method according to claim 1, wherein the known damage patterns are stored in a database.

10. The method according to claim 1, wherein one or a plurality of the steps are carried out in an at least partially automated manner.

11. The method of claim 1, wherein the method is carried out in a system for the diagnosis of aircraft gas turbine engines.

12. The method of claim 1, wherein the method is carried out by a computer program product with a program code, which is stored on a medium readable by a computer.

13. The method according to claim 3, wherein prior to determining the cause probabilities, the model of the aircraft gas turbine engine is calibrated, based on current actual parameter values of the aircraft gas turbine engine.

* * * * *